Feb. 13, 1940.  G. GARDNER ET AL  2,189,790
SEXTANT
Filed Dec. 1, 1938  4 Sheets-Sheet 1
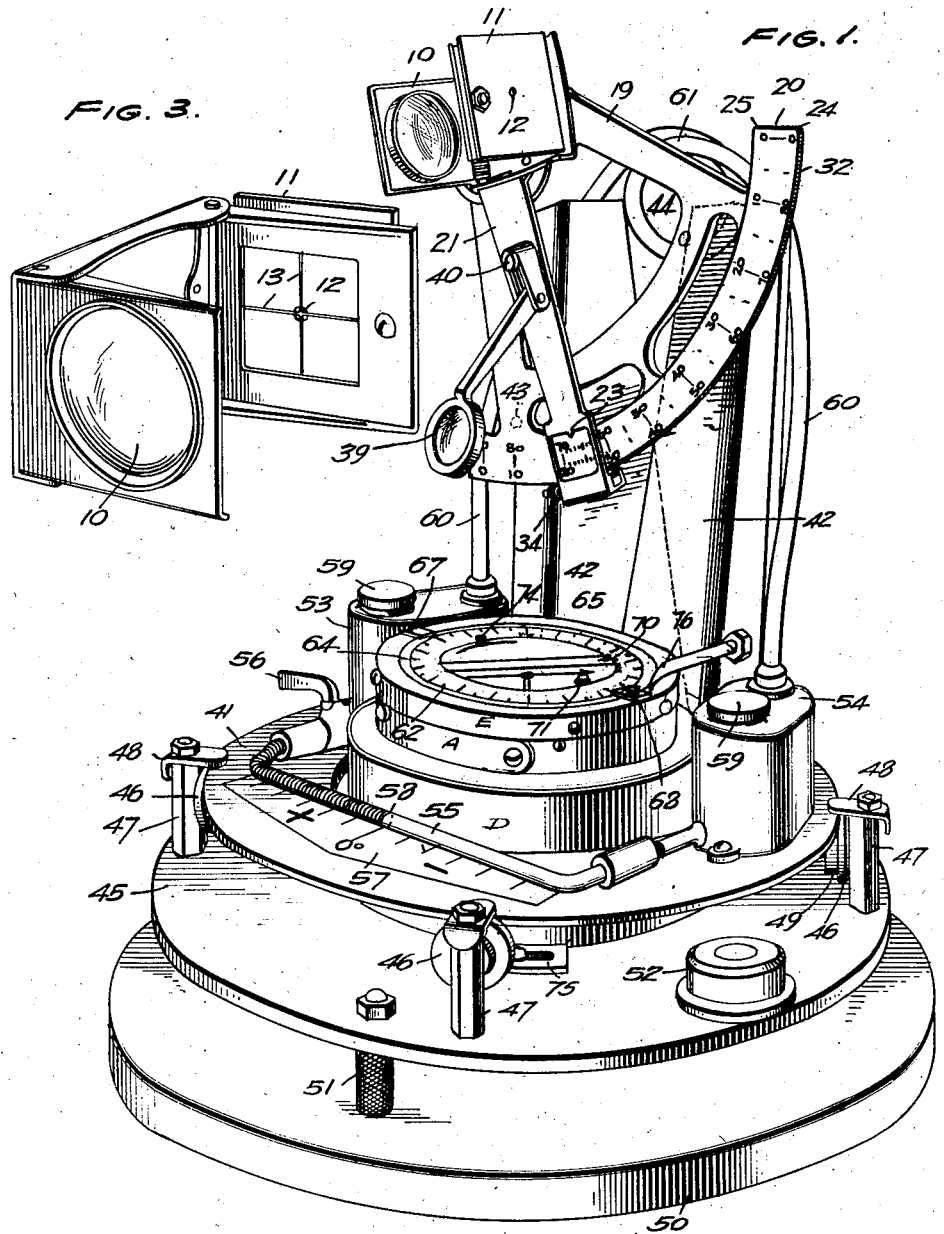
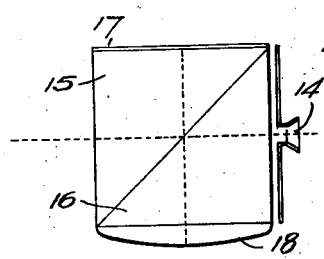
INVENTORS
GRANDISON GARDNER
HARRISON G. CROCKER
ATTORNEYS

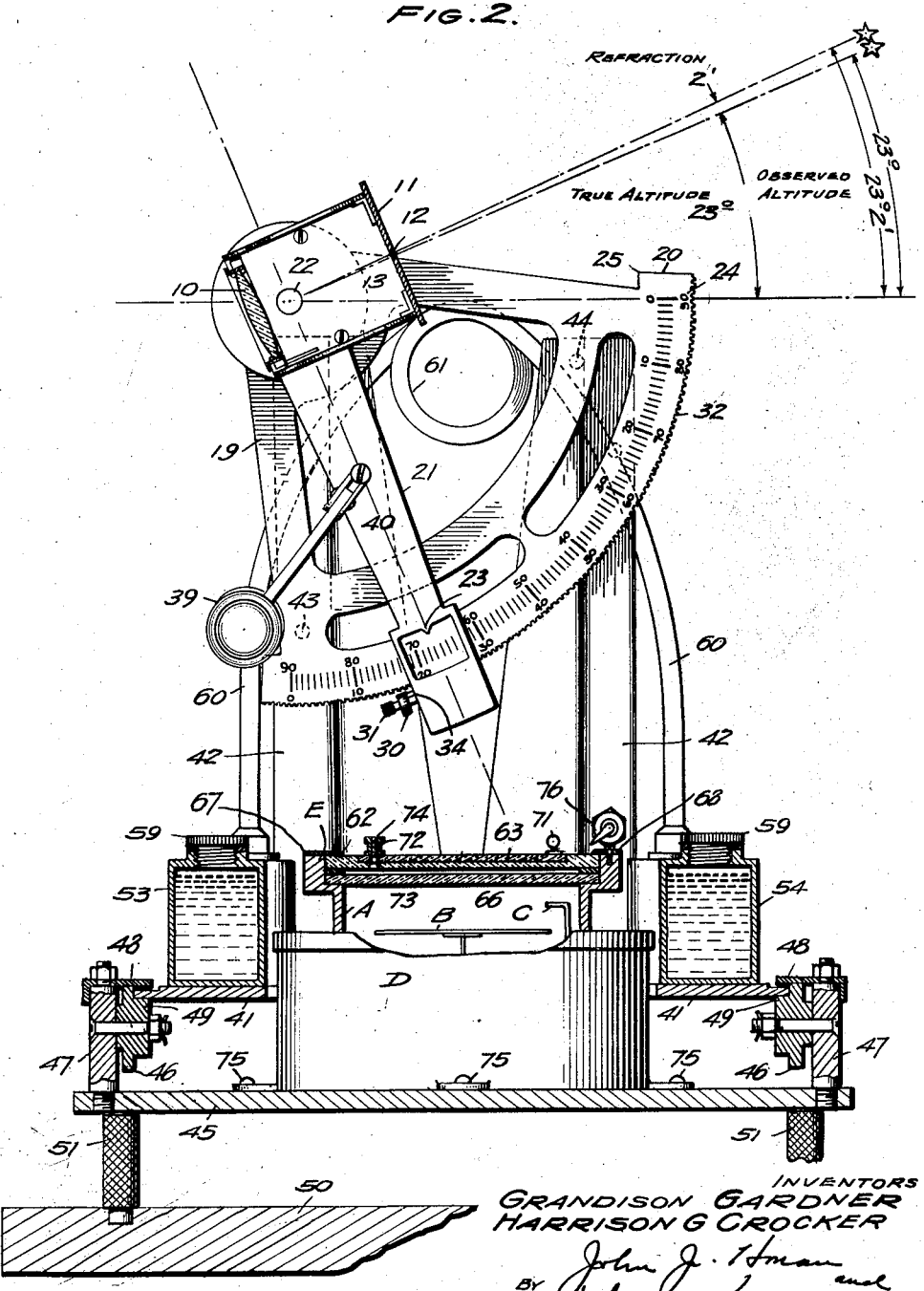

Feb. 13, 1940. G. GARDNER ET AL 2,189,790
SEXTANT
Filed Dec. 1, 1938  4 Sheets-Sheet 3

INVENTORS
GRANDISON GARDNER
HARRISON G. CROCKER
BY *John J. Hyman*
*Wade Kontz*
ATTORNEYS

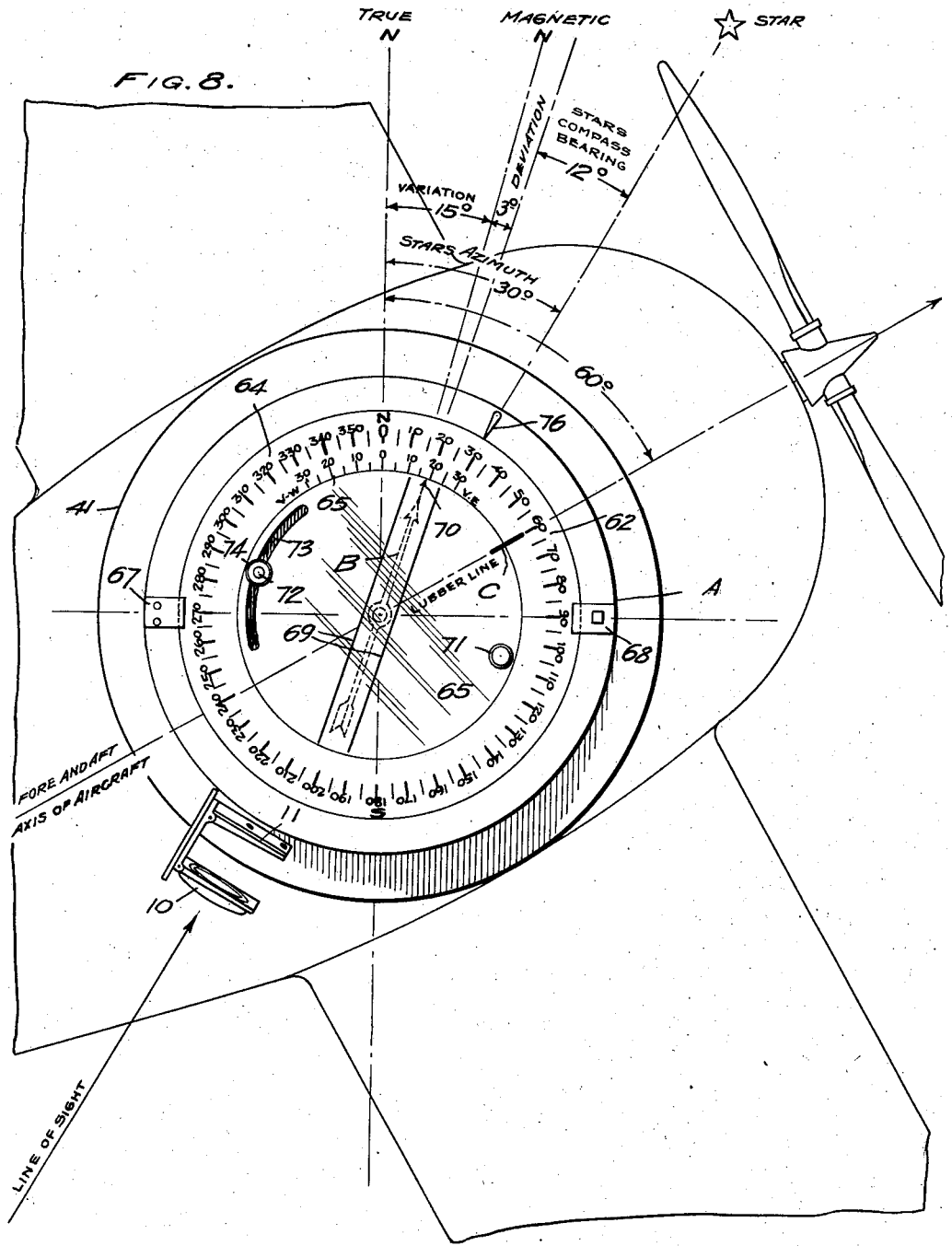

Patented Feb. 13, 1940

2,189,790

UNITED STATES PATENT OFFICE 2,189,790

SEXTANT

Grandison Gardner, March Field, Calif., and Harrison G. Crocker, Langley Field, Va.

Application December 1, 1938, Serial No. 243,393

6 Claims. (Cl. 33—70)

(Granted under the act of March 3, 1883, as amended April 30, 1928; 370 O. G. 757)

The invention described herein may be manufactured and used by or for the Government for governmental purposes, without the payment to us of any royalty thereon.

This invention has reference to that class of navigational instruments intended for measuring altitudes of heavenly bodies and to which the term "sextant" is generally applied regardless of the specific form of the instrument or of the optical principle upon which it is based.

Various types of artificial horizon sextants, such as gyroscopic sextants, pendulum sextants and bubble sextants, have been devised and developed for use on board aircraft with varying degrees of success. The bubble sextant is generally preferred because of its simplicity. Sextant observations made from aircraft are subject to certain errors inherent in the design of the sextant and the accuracy of the observations is largely dependent upon the skillful use and manipulation of the sextant resulting from considerable practice and experience with the instrument.

The most serious defects of conventional aircraft sextants are: (1) The method of sighting is indirect; (2) A bubble must be observed simultaneously with the celestial body; and (3) They do not read the direction (azimuth) of the body.

The present invention is a combination of devices and improvements incorporated in a single instrument or sextant to read altitude or zenith distance and direction of celestial bodies without the three defects mentioned above. Another object of the invention is to provide an instrument which is especially adapted for the purposes of instruction and which supplies the need for a convenient, understandable, instrument that beginners can operate satisfactorily without excessive practice. A further object of the invention is to provide a novel design of instrument which, in addition to the advantages previously set forth, has the further advantage of being capable of use in connection with spherical position finders or computers (reference Hagner position finder, U. S. Patents No. 2,064,061 and No. 2,064,062, granted Dec. 15, 1936) making it possible thereby to obtain a point fix readily from high angle readings from a single celestial body.

Additional objects and advantages of the invention are referred to in the following detailed description of the instrument which is illustrated in the accompanying drawings, wherein:

Figure 1 is a view in perspective of a direct sighting, azimuth reading, no bubble, aircraft sextant embodying the principles of the invention.

Figure 2 is a side view, partly in elevation and partly in section, of the instrument.

Figure 3 is a detail view of a non-magnifying optical sight forming part of the instrument.

Figure 4 is a detail view of an alternate sight which may be used when so desired.

Figure 6:
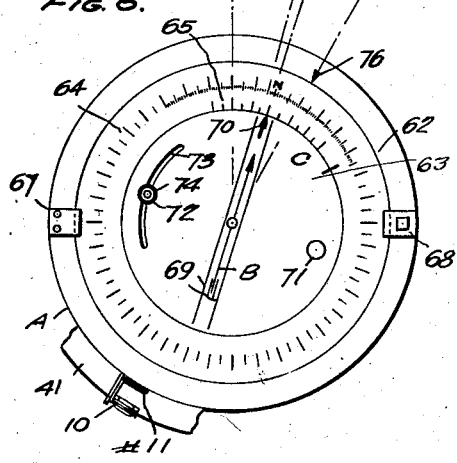
Figure 7:
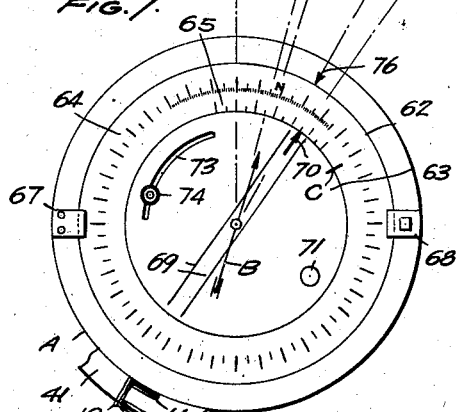

Figures 6, 7, and 8 are diagrammatic views of the instrument on an enlarged scale and exaggerated to show clearly the manner in which the instrument functions to give a true azimuth reading.

This sextant consists of a special angular scale calibrated to read altitude or zenith distance; a non-magnifying optical sight incorporating a cross line or circle at infinite focus such that both eyes may be focused at infinity so that one eye may view the general area or the constellation in which the body observed is located while the other eye views the cross line, or so that one eye can view both the celestial body including its general area or constellation and the cross line; a magnetic or gyro compass with suitable index so that the azimuth of the body may be determined; bubble levels and adjusting screws or gimbals for leveling the base of the instrument which is to be fixed to the aircraft; a recording liquid or other level indicator to show the amount that the instrument base lacks of being level at the time observations are made; suitable roller bearings so that the sight can be readily moved in azimuth with a micrometer or other screw for fine adjustment; suitable mechanism for moving the sight in vertical angle and for reading vertical angle; suitable frame work, mountings and other auxiliary parts; and an improvement to the conventional magnetic compass for setting variation in such a way that the azimuth zero may be set on true north before making an observation, thereby, making it possible to read true azimuth.

The drawings disclose two different forms of non-magnifying optical sights, either of which can be used to direct the line of sight of the observer. In the form shown in Fig. 3 the sight embodies a lens 10 and a reticle card 11, containing a small pinhole 12 through which light from the observed celestial body passes, and a pair of fine cross hairs or lines 13 centered with respect to the pinhole; the card being so positioned relatively to the lens that the pinhole and cross lines are in the focal plane of the lens. The card is coated with luminous paint to make the pinhole and cross hairs visible at night. When using the sight, the observer looks with one eye through the lens at the cross lines while with the other eye he views the star and the general area or constellation about it, making it easy to locate the proper star or other celestial body and to identify it by its position in the constellation. The alternate form of sight, shown in Fig. 4, is a collimator. This device comprises a peep hole 14 in front of which are arranged two forty-five degree prisms 15 and 16 through which the celestial body is observed when the observer looks through the peephole. A flat black glass 17 contains the cross lines and is glued on top of the prisms. Light from these cross lines strikes a parabolic mirror 18 which is glued underneath the prisms and is reflected back to the forty-five degree joint and from there to the eye, appearing to come from an infinite distance. Light from the body observed comes through directly and the eye focuses the same for both. A light silver coating is sometimes used at the diagonal joint to aid reflection.

The sight is used in connection with a sextant frame 19 having a graduated arc or limb 20 and an arm 21 arranged to pivot about the point 22, see Figure 2, near the center of curvature of the limb 20. The sight is mounted directly on the upper or pivoted end of the arm 21, by the movement of which the line of sight is directed toward the celestial body being observed. During the pivotal movements of the sight arm 21, the free end of the latter slides along the arc 20 and carries an index 23 for reading the arc which may be graduated in degrees and minutes or in degrees only. In the drawings, the arc is shown graduated to indicate even degrees from 0 degree to 90 degrees. Two sets of graduations are provided on the arc: one set indicated at 24 reading altitude and the other set indicated at 25 reading zenith distance. For setting the arm, a tangent micrometer screw mechanism with a drum indicating minutes of arc is preferred to the usual vernier with its clamping and slow-motion screws. Hence, as shown to advantage in Figure 5, the free end of the arm is provided with a U-shaped frame or screw carriage 26 in which is hingedly mounted for movement about a horizontal axis 27, a smaller frame 28. This smaller frame provides a support or bearing for an endless tangent screw or worm 29 carrying a micrometer drum 30 graduated in minutes of arc. The drum has a milled head 31 for rotating the screw which is normally held in mesh with a rack 32 on the arc by the pressure of a flat spring 33 fixed to the screw carriage 26 and bearing against the screw supporting frame 28. The screw is pitched to move the arm 21, and hence the line of sight, through an angle of 1 degree (with small correction for refraction) for one complete rotation of the micrometer drum. An index 34 is provided on the frame 28 for reading the micrometer drum scale. The micrometer mechanism is used generally for obtaining a fine setting or adjustment of the arm. For making rapid approximate settings of the arm, the worm is thrown out of mesh with the rack by pressing downwardly on the milled head 31 to overcome the pressure of the spring 33; the screw carriage 26 being cut out at 35 to allow for the downward movement of the pivoted frame 28.

Figure 5:
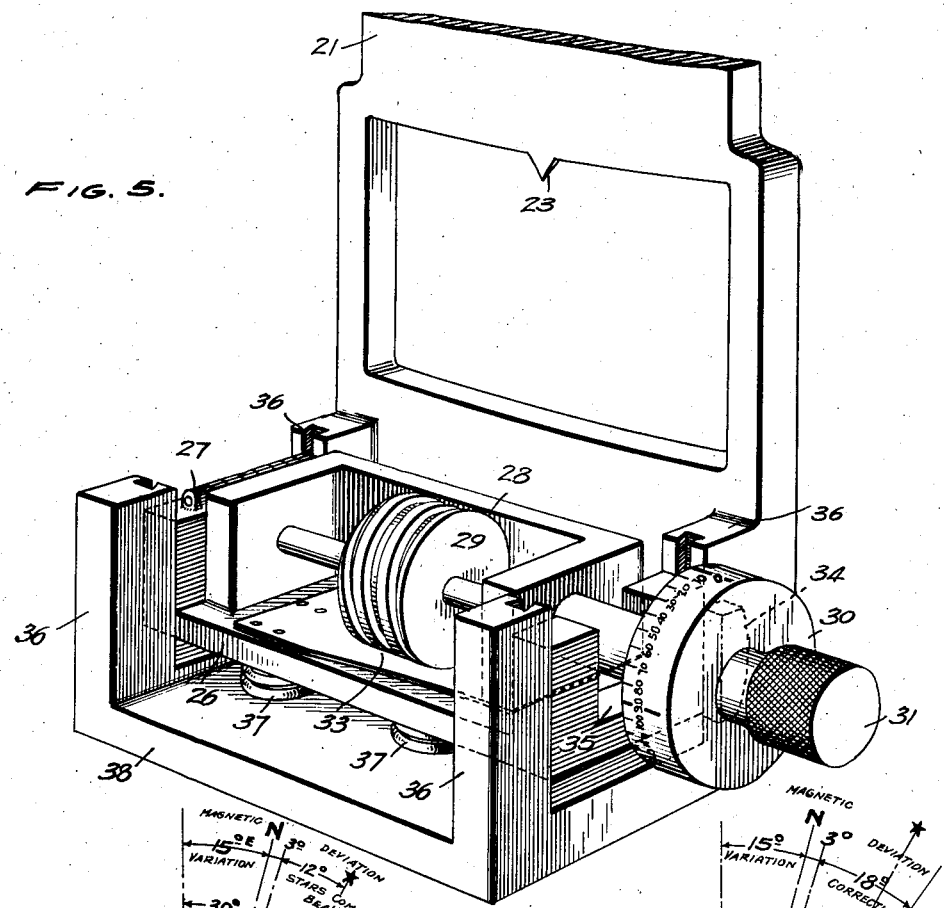
Figure 5 is a detail view in perspective of the tangent micrometer screw mechanism.

The observed altitude of a celestial body, as measured with a conventional sextant, must be converted to the true altitude by the application of certain corrections for which recourse must be had to prepared tables. The altitude of the observed body is always less than the angle indicated by the conventional sextant due to the refraction of the light rays and correction must be made to the instrument reading to obtain the correct altitude angle. For example, if the sextant reading is 23 degrees, 7 minutes, the true altitude angle is 23 degrees, 7 minutes minus 2 minutes (refraction) or 23 degrees, 5 minutes. The time and labor involved in referring to tables for these corrections and in applying same is avoided by the present instrument which is designed to correct automatically for refraction. To this end the arc 20 of the sextant frame and the micrometer mechanism are constructed to function as a special angle scale which reads the actual angle of the sight in degrees and minutes minus the refraction for that angle. In the conventional sextant, the point about which the index arm pivots is the center of curvature of the arc or limb; the radius being constant. For the purposes of the present invention, however, the radius of the arc 20 varies slightly and inversely as the altitude angle, becoming longer as the altitude angle decreases, to automatically correct for refraction of the incoming light ray. The principle upon which the construction of the special angle scale is based may be readily understood from the following explanation and by reference to Figure 2. Assume an observed altitude of a heavenly body, as measured with a conventional sextant, to be 23 degrees and 2 minutes and that the correction for refraction is 2 minutes. The correction for refraction always should be subtracted. By shifting the sextant scale slightly, i. e., the amount of the correction, an angle of sight of 23 degrees and 2 minutes would be marked 23 degrees which would be the true altitude of the body. This correction increases as the angle decreases. If the angle were indicated by a micrometer screw, as in Figure 2, such a shift of the scale would not be possible without pinching the screw thread. By gradually increasing the radius of the arc, however, the thread could be uniform and the travel of the micrometer head would be greater, in proportion to the reduction in angle, for the small angles than for large angles. The angular travel of the arm 21 (measured in radians) is equal to the travel of the worm gear 29 along the arc divided by the radius of the arc. If the sight is directed vertically upward and a star is 80 degrees above the horizon (zenith distance 10 degrees), it would be necessary to turn the worm gear through ten complete revolutions to sight the star. If the altitude of the star is 45 degrees, refraction would make it appear to be 45 degrees and 1 minute. The reading should be 45 degrees and the worm gear, to read 45 degrees, should have forty-five complete turns from the vertical. In order to do this, the integral of the differential angle times the radius should make the total arc traveled over equal to the minimum radius times a 45 degree angle (measured in radians). The demonstration of this radius would require mathematical calculation involving the principles of calculus. The submission of formulae for that purpose is deemed not necessary here. Accordingly the arc 20 of the instrument varies in radius to automatically correct for refraction so that, as shown in Figure 2, the index 23 reads the true rather than the apparent altitude of the observed body. In view of the varying radius of the arc, the length of the arm 21 measured from the pivot point 22 to the tangent screw or worm 29 also must be variable. This is accomplished by mounting the screw carriage frame 26 for vertical sliding movement between guides 36 forming an integral part of the lower end of the sight arm 21, as shown in Figure 5, and providing cushion springs 37 between the base of the frame 26 and the foot 38 of the arm to hold the tangent screw 29 in mesh with the rack 32 of the arc. A reading glass 39, attached to the sight arm 21 and turning upon pivots 40, facilitates the reading of the angle scale and micrometer drum.

The sight and its associated sextant frame is supported at a suitable elevation above an annular member or turntable 41 by means of standards 42 extending vertically upward from the table on one side of the center thereof and adjacent its peripheral edge. The frame is mounted perpendicular to the plane of the table and rigidly fastened to the standards 42 at suitable points 43 and 44. The turntable is supported in parallelism to a main base or leveling head 45 on rollers 46 so that it can be turned about a vertical axis for moving the sight in azimuth. The rollers are carried by short vertical posts 47 mounted on the main base or leveling head 45. Horizontal clips 48, fixed to the posts and extending over the table, coact with bearing shoulders 49 on the rollers to retain the table upon the rollers and to guide and to steady the latter during its movement thereon. The leveling base 45 is mounted on the head 50 of a suitable support, such as a post or tripod, in much the same manner as a surveyor's transit or theodolite is mounted on its tripod, through screw legs 51 for leveling. A universal bubble level 52 mounted on the base 45 facilitates leveling the instrument with respect to the support when the aircraft is in level flight. The support is fixed to the aircraft so that an observer can walk around it and sight the instrument in any direction. At a time of making an observation of a celestial body the instrument may not be absolutely level, due to a departure of the aircraft from a condition of level flight and the amount by which the instrument lacks of being level must be taken into consideration when reading the altitude of the body. The device for indicating the amount which the instrument lacks of being level at the time of observation comprises two liquid-containers or wells 53 and 54 fixedly mounted on the turntable 41 and having bottom outlets connected by a glass tube or conduit 55, the latter being provided with a stopcock 56. The wells 53 and 54 serve as reservoirs for two nonmiscible liquids of contrasting colors; one liquid, such as colored alcohol, being contained in one of the wells and the other liquid, such as transparent kerosene, being contained in the other well. The specific gravity of the alcohol is adjusted to equal that of the kerosene. A scale 57 having degree marks to the right and left of zero is suitably provided on the turntable adjacent the glass tube as shown in Figure 1. When the base 45 is level, the line of junction 58 between the alcohol and the kerosene lies over the zero point of the scale 57. When the base is not level, this line of junction is moved, either to the right or left of zero, a distance sufficient to make small angles easily readable. This distance can be made as large as desired for any angle of inclination of the base by reducing the relative cross sectional area of the tube 55 and the wells 53 and 54. The scale 57 is marked to show whether the reading is to be added to or subtracted from the reading of the arc 20. The index 23 of the sight arm indicates the angle of the sight with reference to the base of the instrument and liquid index 58 indicates the small angle by which the base lacks of being level. The stop cock, when closed, holds the reading of the auxiliary scale so that it need not be observed while looking through the sight. The wells are provided with filling caps 59 and also are connected at their tops by a long bent spill tube 60 to equalize the air pressure therebetween. The spill tube may or may not be provided with a loop 61, as desired, to make it less easy for the liquid to spill from one well over to the other when the instrument is tipped on its side or inverted.

A special feature of the invention is the provision of means for determining the azimuth of the observed body. For this purpose a magnetic or gyro compass with suitable index can be employed. The compass illustrated in the accompanying drawings is a magnetic type comprising the bowl A, needle B, lubber line C, cover assembly D, and azimuth ring E. In standard compasses, the azimuth ring is provided with degree graduations and two parallel grid lines or wires parallel to a vertical plane passing through the N and S graduations. The ring can be rotated in the horizontal plane for lining up the grid lines with the compass needle; the lines being fixed components of the ring assembly. Means are usually provided for locking the ring in any desired position. In conventional practice, the azimuth ring is used to set and fly a determined course; the ring being rotated to position the grid lines parallel to the compass needle with the zero mark over the N end of the needle or on magnetic north. The lubber line C then reads magnetic azimuth. To determine the true course or bearing, the compass reading must be corrected for variation and deviation. For the purposes of the present invention, the conventional azimuth ring construction is modified and improved so that by suitable adjustment thereof a reading of the true rather than the magnetic azimuth of the observed body can be had and arithmetical correction avoided. Briefly, the modification consists mainly in separating the parallel grid lines from the ring containing the "N" and providing an index whereby the grid lines can be rotated relative to the "N" ring by the amount of the local magnetic variation. Thus, when the grid lines are lined with the compass needle, the "N" is toward true north and the azimuth reading is true. It is to be understood that when reference is made herein to correcting for local magnetic variation, correction for deviation also is intended. Referring more specifically to Figs. 1 and 2 of the accompanying drawings, the azimuth ring E, as modified, comprises a pair of superposed transparent members, such as the circular glass plates or disks 62 and 63; the top member being smaller in diameter than the other which is preferably recessed to seat the top member so that the outer surfaces of the two members are in the same horizontal plane. The larger member 62 constitutes the "N" ring and is provided with main degree graduations 64 and a variation scale 65, the latter being centered with respect to the main zero degree graduation. The "N" ring overlies the compass bowl cover glass 66 and is rotatable with respect to the compass bowl to which it is suitably secured, as by retaining clips 67 and 68; one of which serves as a clamp for holding the ring in the position to which rotated. The smaller member 63 is provided with the parallel grid wires or lines 69 and a pointer or index arrow 70. The member 63 has a knob 71 by means of which it can be rotated relative to the "N" ring 62 for shifting the grid lines a number of degrees corresponding to the amount of the local magnetic variation. Any suitable means may be employed for holding the members 62 and 63 in their relatively adjusted position. The particular means shown comprises a threaded stud 72 integral with the member 62 and extending through an arcuate slot 73 in the member 63, with a clamping nut 74 screwed on the end thereof.

The compass is centered, as a unit, upon the main base or leveling head 45 of the instrument, to which it is fixed as shown at 75, and extends upwardly through the opening in the annular turntable 41. The azimuth of the observed body is read directly from the compass by means of an index pointer 76 fixed to and extending laterally of a standard 42 to a point adjacent the graduations of the compass. In adjusting the compass to correct for magnetic variation, assuming the "N" mark or zero of the ring 62 to be over the point of the compass needle, the clamping nut 74 is loosened and the member 63 is rotated relative to the "N" ring an amount corresponding to the required correction. For example, in Figure 6, the compass bearing of the star, i. e., the angle between the compass needle and the pointer 76 is represented as being 12 degrees; deviation 3 degrees E, and variation 15 degrees E. Knowing the deviation and variation, the observer in advance of making an observation rotates the member 63 until the index arrow 70 thereof is opposite the 78 degree mark on the positive side of the variation scale 65, since in this case the combined deviation and variation (3 degrees plus 15 degrees) is to be added to the compass reading. After this adjustment, shown in Figure 7, the members 62 and 63 are clamped against relative displacement by tightening nut 74 and both members are then rotated relative to the compass bowl until the grid lines 69 are again parallel with the compass needle. The zero mark of the "N" ring 62 is thereby placed on true north, as shown in Figure 8, and when a sight is taken on the star the pointer 76 indicates the true azimuth of the body, or 30 degrees. The improved azimuth ring E, in addition to the use just described, also can be used for steering. For instance, at March Field, the variation is 15 degrees, 40 minutes, east, and to find the true heading of the aircraft, the arrow head 70 at the end of the parallel grid lines is placed to read 15 degrees, 40 minutes E on the variation scale 65 without disturbing the position of the "N" ring 62 relative to the compass needle. The member 63 is then secured to the "N" ring 62 and if both members are together rotated until the grid lines are parallel to the compass needle, the "N" of ring 62 will be true north and the lubber line C will indicate the true heading of the aircraft. If a certain heading is desired, the members 62 and 63 are both moved until the lubber line C is on the desired heading and then fixed to the bowl and consequently to the aircraft. The aircraft is then turned until the grid lines are parallel to the compass needle whereby the desired heading is established. The improved azimuth ring herein described and illustrated represents but a single plan and method of modifying a conventional structure for the purposes of the present invention and it is to be understood that other modifications within the scope of the invention are contemplated, the nature and character of which modification will vary in accordance with the particular type of compass to which applied.

The method of using the instrument for astronomical observation from aircraft is as follows: Notify the pilot that readings are to be taken and allow him time to level and steady the aircraft into the position in which he is to hold it during observation. Level the sextant base 45 and open the stop-cock 56. Move the sight in azimuth and altitude until the cross lines 13 are centered on the body observed. Leave sight in position and close the stop-cock. Then read both vertical scales 26 and 57 and subtract the liquid level reading from or add it to the main arc reading and record. Read and record azimuth, as indicated by the position of the pointer 76. The provision of the auxiliary level 55 makes it possible to determine the altitude or zenith angle of a celestial or other body without observing a bubble or other reference simultaneously with the body and reading azimuth along with altitude makes it possible to get a point fix from observation of a single body.

In addition to the advantages enumerated above, the instrument can be properly sighted with a minimum of practice and the declination of the observed body, the sextant altitude or the zenith angle and the sextant azimuth can be set on appropriate arcs of any spherical position finder or computer, such as the Hagner position finder previously referred to and identified herein. Then, when the indices of the position finder or computer are matched, the latitude and local hour angle or latitude and longitude of the observer's position is determined directly. The addition of an azimuth reading makes it possible to obtain a point fix from observations of a single body whereas conventional methods and devices make it possible only to determine a position line of indefinite length.

Having thus described the invention, what we claim is:

1. An azimuth ring for a magnetic compass comprising a pair of superposed transparent members rotatable about a common axis, one of said members being recessed to seat the other so that the outer surfaces of the two are in the same horizontal plane, the seating member being provided with compass degree markings and a magnetic variation scale centered with respect to the north indication of the said compass degree markings and the seated member being provided with parallel grid lines to be lined up with the compass needle and an index so related to the grid lines that when the latter are disposed in line with the north and south indications of the said compass markings the index will be opposite the zero of the variation scale, means for supporting the said members for rotation on a compass with the axis of rotation of the members coincident with the axis of the compass, means on the seated member for rotating it with respect to the seating member to shift the grid lines a number of degrees corresponding to the local magnetic variation, means for holding the said members in the position to which relatively rotated, and means operable for holding the members against rotation with respect to the compass.

2. An astronomical instrument comprising a sextant frame including an arc graduated to read angles of altitude and varying in radius slightly and inversely as the altitude angle to automatically correct for refraction, an index arm of variable length arranged to pivot at one end about a point near the center of curvature of the arc and with its free end constrained to move over the said arc, sighting means on the pivoted end of the arm for viewing a celestial body direct, means at the free end of the arm for turning the latter about its pivot to direct the sighting means, and level means associated with the said frame and including means for indicating subsequent to taking a sight the amount which the instrument may lack of being level at the time the sight is taken.

3. A navigation instrument for measuring astronomical angles from aboard moving aircraft, comprising a leveling base fixed to the aircraft to be truly horizontal when the aircraft is in level flight, a direction indicator on said base for indicating true north, sighting means mounted for angular displacement about separate axes at right angles to each other and having one of said axes fixed in a plane perpendicular to the plane of the base, means responsive to the movement of the sighting means about its perpendicular axis for indicating the angular displacement of the sighting means with reference to the true north indication of the direction indicator, means responsive to the movement of the sighting means about its other axis for indicating the angular elevation of the sighting means with respect to the base in terms of the corresponding angle between the base and the object sighted on, and inclinometer means structurally connected with the said base and the aircraft to be responsive to changes in attitude of the aircraft for indicating the inclination of the said base relative to the horizontal and including stop means operative for restraining the index of the inclinometer means against displacement to prevent any change in the indication of the inclinometer means whereby when said stop means is operated instantaneously with the centering of the sighting means on the object sighted the instantaneous inclination of the base relative to the horizontal at the time of taking the sight will be indicated at a time subsequent to taking the sight and regardless of any subsequent change of attitude of the aircraft.

4. A navigation instrument for measuring astronomical angles from aboard moving aircraft, comprising a leveling base fixed to the aircraft to be truly horizontal when the aircraft is in level flight, a direction indicator on said base for indicating true north, a turntable connected to said base but free to be turned about an axis perpendicular to the base, said turntable being centered with respect to the direction indicator, a sector frame fixed to said turntable and extending perpendicularly thereto, a sighting member pivoted to the frame for angular movement about an axis at right angles to the frame, co-acting means on the frame and sighting member for indicating with correction for refraction the elevation of the sighting member with respect to the said base, co-acting means on the sighting member and the direction indicator for indicating the angular displacement of the sight relative to the north indication of the direction indicator, and a level indicator fixed relatively to the said frame and including a device for locking the index of the said indicator against displacement whereby the instantaneous inclination of the base relative to the horizontal at the time of taking a sight may be indicated subsequent to taking the sight and regardless of any change in the attitude of the aircraft.

5. A navigational instrument for measuring astronomical angles from aboard moving aircraft comprising a turntable mounted in the aircraft with its plane of rotation fixed relative to the aircraft so as to be truly horizontal when the aircraft is in level flight, a sighting member carried by the turntable and rotatable about an axis at right angles to the axis of rotation of the turntable, co-acting means on the sighting member and turntable respectively for indicating the vertical angle between the two in terms of the corresponding vertical angle between the turntable and the object sighted on, means for indicating a fixed direction in azimuth, co-acting means on the turntable and the direction indicating means for indicating the azimuth angle of the sight, a pair of liquid containers fixedly mounted on the turntable at relatively opposite sides of the center thereof and having a substantially straight and transparent connecting conduit provided with a stopcock in the passage therethrough, two non-miscible liquids of equal specific gravity and contrasting colors on the said containers and having the line of junction therebetween within the said conduit, and a scale fixed relative to the said conduit and having a zero indication with which the line of junction of the two liquids coincides when the said turntable is level, said scale being marked to indicate whether the reading thereon is to be added to or subtracted from the reading of the vertical angle of the sight.

6. A sextant having in combination a frame provided with a graduated arc, an arm extending radially of the arc and pivoted to the frame for angular movement about an axis centrally of and at right angles to the plane of the arc, connecting means between the arc and one end of the arm operable for moving the latter about its axis, an eye piece on the other end of the arm including a lens mounted perpendicular to the plane of the arc, an axially spaced parallel similarly mounted opaque reticle card having a small pinhole for admitting light from an observed body and a pair of fine cross hairs on one side thereof centered with respect to the pinhole, said card being fixed to the arm in front of the eye piece and with the pinhole and cross hairs in the focal plane of the eyepiece lens.

GRANDISON GARDNER.
HARRISON G. CROCKER.